United States Patent
Livingston

(10) Patent No.: US 6,636,820 B2
(45) Date of Patent: Oct. 21, 2003

(54) METHOD AND APPARATUS FOR MEASURING WEIGHT USING UNCALIBRATED LOAD CELLS

(75) Inventor: Richard A. Livingston, Webster Groves, MO (US)

(73) Assignee: BECS Technology, Inc., St. Louis, MO (US)

( * ) Notice: Subject to any disclaimer, the term of this patent is extended or adjusted under 35 U.S.C. 154(b) by 0 days.

(21) Appl. No.: 10/079,023

(22) Filed: Feb. 20, 2002

(65) Prior Publication Data

US 2003/0158684 A1 Aug. 21, 2003

(51) Int. Cl.[7] .............................................. G06F 19/00
(52) U.S. Cl. ......................................... 702/101; 453/32
(58) Field of Search ........................... 702/101; 453/32; 177/210 R

(56) References Cited

U.S. PATENT DOCUMENTS

| | | |
|---|---|---|
| 4,760,539 A | 7/1988 | Amacher et al. |
| 4,804,052 A | 2/1989 | Griffen |
| 4,909,338 A | 3/1990 | Vitunic et al. |
| 4,974,679 A * | 12/1990 | Reuter .................... 177/210 R |
| 5,276,432 A | 1/1994 | Travis |
| 5,805,467 A | 9/1998 | Richards |
| 6,064,629 A | 5/2000 | Stringer et al. |
| 6,112,162 A * | 8/2000 | Richards ..................... 702/101 |
| 6,176,774 B1 * | 1/2001 | Filiberti et al. ............... 453/32 |
| 6,298,009 B1 | 10/2001 | Stringer |

* cited by examiner

Primary Examiner—John Barlow
Assistant Examiner—Xiuqin Sun
(74) Attorney, Agent, or Firm—Polster, Lieder, Woodruff & Lucchesi

(57) ABSTRACT

A method and apparatus for calibrating load cells in the filed after the uncalibrated load cells have been installed. Two known weight conditions are used in conjunction with a storage device in which the uncalibrated load cells are installed. The method will calibrate the load cells, calculate load cell offsets, scale factor differences between load cells, and flexure/stresses in a supporting structure which rests upon the uncalibrated load cells.

22 Claims, 3 Drawing Sheets

A. INSTALL UNCALIBRATED LOAD CELLS.
INSTALL UNCALIBRATEDRATED LOAD CELLS UNDER THE SUPPORTING LEGS OF A STORAGE DEVICE A STORAGE DEVICE

B. MAKE CONNECTIONS.
ATTACH THE OUTPUTS FROM EACH OF THE INDIVIDUAL UNCALIBRATED LOAD CELLS TO A COMPUTING DEVICE

C. CALCULATE MINIMUM CALIBRATION
1. WITH THE STORAGE DEVICE EMPTY OR AT SOME LOW BUT KNOWN WEIGHT, RECORD THE OUTPUT VALUE FROM EACH OF THE INDIVIDUAL UNCALIBRATED LOAD CELLS.
2. COMBINED THESE INDIVIDUAL OUTPUT VALUES AND SAVE AS *Wmin*.

D. CALCULATE "MINIMUM CALIBRATION.
1. DETERMINE INDIVIDUAL LOAD CELL OFFSETS.
2. DETERMINE DEFAULT VALUES OF THE INDIVIDUAL LOAD CELLS

E. PROCEED TO STEP F

FIGURE 2A. FLOW DIAGRAM

F.
CALCULATE MAXIMUM CALIBRATION.
1. LOAD THE STORAGE DEVICE, PREFERABLEY NEAR THE FULL CONDITION OF THE STORAGE DEVICE, WITH A SUBSTANCE HAVING A KNOWN WEIGHT.
2. RECORD THE OUTPUT VALUE OF EACH OF THE LOAD CELLS.
3. COMBINE THE OUTPUT VALUES FROM EACH LOAD CELL

G.
CALCULATE ESTIMATED WEIGHT OF SUBSTANCE.
1. GRADUALLY REMOVE SUBSTANCE FROM THE STORAGE DEVICE.
2. ESTIMATE WEIGHT BY USING DEFAULT NOMINAL VALUES FOR THE SCALE FACTORS OF EACH LOAD CELL AS DETERMINED IN STEP D ABOVE.
3. WHEN THE ESTIMATED REACHS 90% OF THE FULL WEIGHT (OR SOME OTHER ARBITRARY POINT), CALCULATE FINAL CALIBRATION FACTORS BY USING THE FOLLOWING EQUATION:

$$C_i = \frac{\left[\sum_{i=1}^{n}(N100_i - N90_i)\right]}{(N100_i - N90_i) \times n}$$

H.
CALCULATE WEIGHT OF SUBSTANCE IN STORAGE DEVICE.
CALCULATE THE WIEGHT OF THE SUBSTANCE WITHIN THE STORAGE DEVICE USING THE FOLLOWING EQUATION:

$$W = \frac{\sum_{i=1}^{n}\delta N_i \cdot C_i}{\sum_{i=1}^{n}(N_{MaxCal\_i} - N_{MinCal\_i}) \cdot C_i} \cdot (W_{MaxCal} - W_{MinCal}) + W_{MinCal}$$

I. ( PROCESS COMPLETE )

FIGURE 2B. FLOW DIAGRAM

METHOD AND APPARATUS FOR MEASURING WEIGHT USING UNCALIBRATED LOAD CELLS

CROSS-REFERENCE TO RELATED APPLICATIONS

None.

STATEMENT REGARDING FEDERALLY SPONSORED RESEARCH

Not Applicable.

BACKGROUND OF THE INVENTION

1. Field of the Invention

This invention relates in general to a method of using load sensing devices and, more particularly, to a method of using uncalibrated load cell transducers to accurately weigh an object or quantity of material in a supporting structure subjected to variable stresses and distortions.

2. Description of Related Art

The prior art is generally dominated by devices which use or require calibrated load cell transducers. These calibrated load cell transducers are adjusted individually at the factory to provide the load cell transducers with uniform offset and sensitivity factors. However, calibration, testing, and specialized grouping of load cell transducers at the factory can raise the cost for manufacturing products incorporating the load cell transducers. To reduce this cost factor, previous devices have been invented which attempt to calibrate load cell transducers on products either after those products leave the factory or after the uncalibrated load cell transducers have been field-installed.

For example, U.S. Pat. No. 4,738,324 issued to Borchard, determines load cell offsets, scale factors, and the effects of structural flexure and distortion in the factory, and then programs unique calibration factors into each load cell transducer unit shipped. To accomplish this type of calibration, however, the load cell transducers must be installed prior to shipment from the manufacturer. This is impractical where the load cell transducers must be field-installed onto a storage device such as a grain bin or silo on a farm.

Similarly, U.S. Pat. No. 6,112,162 issued to Richards, attempts to solve this problem by performing an on-site calibration using multiple weights. Each weight is placed on top of each individual load cell transducer, effectively determining the scale factor for that individual load cell transducer. This is repeated for each of the individual load cell transducers, resulting in an awkward and time consuming operation. Variations on this type of invention are additionally disclosed in U.S. Pat. No. 5,805,467 issued to Richards and U.S. Pat. No. 5,724,267 also issued to Richards.

Other patents disclose various methods for calculating weights within or upon flexible structures. Examples of such methods are disclosed in U.S. Pat. No. 6,069,324 issued to Shimizu, et al., and in U.S. Pat. No. 6,209,382 issued to Komata, et al. However, in each of these cases, the method depends upon the use of load cell transducers which have been previously calibrated. As such, these methods are again relatively costly.

Accordingly, there is a need to overcomes these and other problems by providing a method by which lower cost uncalibrated load cell transducers and load sensing devices can be field-installed on flexible structures while still providing the ability to provide accurate weight measurements of substances within the flexible structure.

BRIEF SUMMARY OF THE INVENTION

The present invention resides in a method for performing a calibration process to field-calibrate uncalibrated load sensing devices and load cell transducers. The calibration can be performed when only two known weight conditions exist. The method compensates for load cell offset, scale factor differences between load cells, and flexure or stresses in the structure supporting the weight.

More specifically, this invention is a method for automatically calibrating a set of uncalibrated load cell transducers supporting a variable load whose weight is distributed in some unknown and variable way among the load cell transducers. The calibration method compensates not only for the varying offset and scale factors for the individual load cell transducers, but also compensates for the variable weight distribution on the load cell transducers due to warping and flexibility in the structure supporting the weight and load cells.

The present invention also resides in embodiments of the above invention, including the generation of software which allows for the input of the uncalibrated load sensor and load cell transducer readings and which can process the mathematics of the equations described herein.

Therefore, it is an object of the invention to provide a method which permits the use of less expensive uncalibrated load sensing devices or load cell transducers by calibrating the load cell transducers through a procedure after field-installation. In addition, this method automatically compensates for the unknown and variable distribution of the weight among the several load cells used to measure the weight.

It is yet another object of the invention to provide a method to monitor the weight in any tank, bin, or other structure holding a variable weight where an inexpensive means to monitor weight is required.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 2A is a flow diagram illustrating the first phase of the process of the present invention; and FIG. 2B is a flow diagram illustrating the second phase of the process of the present invention.

Corresponding reference numerals indicate corresponding parts throughout the several figures of the drawings.

DESCRIPTION OF THE PREFERRED EMBODIMENT

Figure 1:
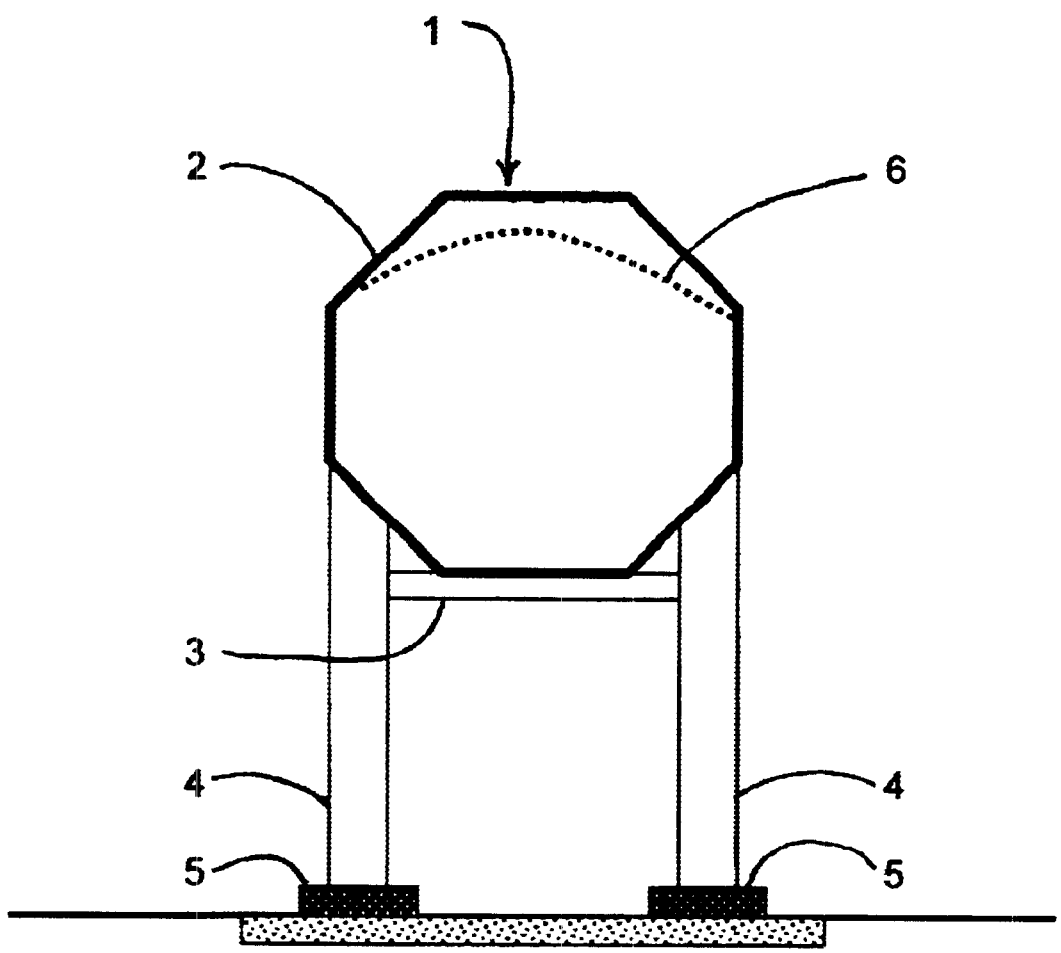
FIG. 1 is a side view of a general embodiment of the present invention showing a common installation of load cells for a supporting structure having multiple legs and variable weight distribution.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Referring now to the drawings, FIG. 1 depicts one embodiment of a weighing method for accurately weighing an object having multiple supports and using uncalibrated load transducers in the presence of variable stresses in the supporting structure.

In a representative embodiment of the present invention, a storage device (1) has a storage bin (2) which is supported by a support structure (3) having a plurality of support legs (4). The storage bin (2) contains a substance (6) which may be unevenly distributed within the storage bin (2). A plurality of uncalibrated load sensing devices, such as load cell transducers (5) are field-installed beneath each of the individual support legs (4). The uncalibrated load cells (5) initially have some offset and scale factor variations from unit to unit. These offset and scale factors are initially unknown. In addition, warping and flexure of the support structure (3) causes the weight of the substance (6) to be distributed unevenly on the several uncalibrated load cells (5), particularly at low weights.

When, in previous devices, calibrated load cells all having the same scale factor (e.g. units/per pound of load) are factory-installed, the total weight is calculated by simply adding up the measurement units, typically voltage or current measurements, from all the calibrated load cells. When using uncalibrated load cells (5), however, a one unit change on one uncalibrated load cell (5) might represent a change in weight of 10 pounds, while the same one unit change on another uncalibrated load cell (5) might represent a change in weight of 20 pounds. In such cases, adding up the measured unit output from all of the uncalibrated load cells (5) will tend to either overestimate or underestimate the actual weight.

This can be visualized easily by considering a plastic patio chair (not shown) that is warped slightly so that it wobbles when not in use. If a single load cell was placed under each of the four legs, two of the load cells would be most active and would show most of the weight of the chair. A third load cell would show some small weight, and the fourth would likely show no weight at all. If a small weight is added to the chair, all the weight will be initially supported by the two most active load cells. As more weight is gradually added, the chair will flex and the third and fourth load cells begin to support more of their share of the total load. If a heavy and equally distributed load is applied (e.g. a person sitting on the chair) the flexibility of the chair will be substantially flattened out and all the load will be distributed evenly among all four of the load cells.

In a similar manner, the present invention recognizes that, when the storage bin (2) is at or near full, small weights added or removed from the storage bin (2) will be equally distributed between the uncalibrated load cells (5). Thus, if the outputs from the uncalibrated load cells (5) are measured when the storage bin (2) is full, and then measured again when weight in the storage bin (2) has been reduced by a small amount, say 10% for example, then the difference in the outputs from each of the uncalibrated load cells (5) accurately represents the scale factor (e.g. volts/pound of load) for each uncalibrated load cell (5).

The present invention then permits these offsets and scale factor variations to be compensated for in the software which reads the outputs from the uncalibrated load cells (5) and calculates the actual weight. The method accomplishes this by application of two reasonably well known weights on the plurality of uncalibrated load cells (5). Now, more specifically, the process of the present invention can be seen by reference to FIG. 2A and 2B, which describes the flow process for the present invention, and by reference to FIG. 1, which depicts a generalized embodiment of the present invention showing uncalibrated load cells field-installed beneath a storage device. As described in Step A, uncalibrated load cells (5) are installed under the support legs (4) of the supporting structure (3) for a storage device (1). In Step B, all of the outputs from each of the individual uncalibrated load cells are connected to the computing device. While these connections are usually electrical, it will be appreciated that any type of connection can be used as long as the output from the uncalibrated load cell (5) can be transmitted to the computing device such as a desktop computer or a laptop computer.

Step C calculates the Minimum Calibration point for the storage device (1). The storage bin (2) is first placed in a minimum load condition, with the storage bin (2) empty, or at some low known weight. The output readings from the uncalibrated load cells (5) are then measured and recorded to obtain their output readings at this low weight. The weight at this condition is identified by the term $W_{min}$.

As noted above in the warped chair example, when the storage bin (2) is at minimum load, warping of the support structure (3) generally causes most of the weight within the storage bin (2) to be supported on less than all of the support legs (4). The other support legs (4) have little or no weight on them. As shown in Step C, individual load cell output readings taken at this time give information on the offsets of each of the individual uncalibrated load cells (5). The offsets for the individual uncalibrated load cell (5) are thus determined at this point, and default values of the individual load cell scale factors are set. Once these offsets and default values are determined Step E transfers the process to Step F.

Step F calculates the Maximum Calibration of the storage device. The storage bin (2) is substantially filled with a substance (6) having a known weight. Substantially as used herein means within a predetermined tolerance. It is preferable that the storage bin (2) be loaded until the storage bin is full or nearly full. The output values of each of the individual uncalibrated load cells (5) is then again recorded. This is the "Maximum Calibration" and is identified by the term the weight $W_{max}$.

In determining $W_{max}$, it will be appreciated that as weight is added to the support structure (3), the support legs (4) tend to settle down onto the uncalibrated load cells (5) one by one. Once all the support legs (4) are down, additional weight added to the storage bin (2) is more or less evenly distributed across the uncalibrated load cells (5) beneath each support leg (4). When the storage bin (2) is full and the maximum weight is applied, it is assumed that the last 10% or so of the weight is evenly distributed among all of the support legs (4) and onto all the uncalibrated load cells (5).

Step G calculates an estimated weight of the substance (6) in the storage bin (2). To do so, weight is gradually removed from the storage bin (2). As the weight is gradually removed, at first, the weight is first removed equally from all the support legs (4) and the uncalibrated load cells (5). By determining the relative rates in change of the load cell output readings during this initial unloading of the bin, relative scale factors can be calculated for each individual load cell.

Additionally, as the substance (6) is removed from the storage bin (2), output readings from the individual uncalibrated load cells, usually in a voltage reading, are monitored by the computing device and the weight is estimated as described below.

As weight is removed from the storage bin (2), the output values from each of the individual uncalibrated load cells (5) are monitored and the weight is estimated using default, nominal values for the scale factors of each uncalibrated load cell as determined in Step D. When the estimated weight drops below 90% of the "full" weight (or some other arbitrary point), the calibration is completed by calculating the final calibration scale factors using the formulas presented below. It is appreciated that during the period before the calibration factors can be calculated, there will be small errors in the calculated weight. However, once the correct scale factors are calculated, the weight calculated will be much closer to the true weight. It is important to note that the calibration calculations are not required to be performed at exactly 90% of the full weight, but rather, may be performed at substantially 90% of the full weight, as defined within a predetermined tolerance. The only requirement is that the weight change enough that the output value from each uncalibrated load cell (5) has changed sufficiently so that an accurate estimate of it's scale factor can be made. By determining the relative rates of change for the output values of the uncalibrated load cells (5) during this initial unloading of the bin (2), relative scale factors can be calculated for each individual uncalibrated load cell (5).

Step G concludes by calculating the scale factors $C_i$. Scale factors are calculated by evaluating the following equation for each uncalibrated load cell:

$$C_i = \frac{\left[\sum_{i=1}^{n}(N100_i - N90_i)\right]}{(N100_i - N90_i) \times n} \quad \text{Eqn. 1}$$

where:

$C_i$=the scale factor for load cell "i"

$N100_i$=the reading from the ith load cell at substantially full load $N90_i$=the reading from the ith load cell at substantially 90% of full load n=the number of load cells After the all the $C_i$'s are calculated in Step G, the weight W is calculated in Step H using the following equation:

$$W = \frac{\sum_{i=1}^{n}\delta N_i \cdot C_i}{\sum_{i=1}^{n}(N_{MaxCal\_i} - N_{MinCal\_i}) \cdot C_i} \cdot (W_{MaxCal} - W_{NimCal}) + W_{MinCal} \quad \text{Eqn. 2}$$

where:

$\delta N_i = N_i - N_{MinCal\_i}$ $N_{MinCal\_i}$=the reading from the ith load cell at the Minimum Calibration $N_{MaxCal\_i}$=the reading from the ith load cell at the Maximum Calibration $C_i$=the scale factor for the ith load cell, as calculated above $W_{MaxCal}$=the weight entered by the user at full load during Maximum Calibration $W_{MinCal}$=the weight entered by the user at no load during Minimum Calibration Equation 2 can be used at all times to calculate the best estimate of the actual weight. During the Minimum Calibration in Step C, the $N_{MinCal\_i}$'s are set to the output values from each uncalibrated load cell (5) and the $C_i$'s are set to 1.000. At this time, the $N_{MaxCal\_i}$'s can be set to some default value if desired so that reasonable, if not accurate, weights can be calculated. During Maximum Calibration in Step F, the $N_{MaxCal\_i}$'s are set to the output values from each uncalibrated load cell (5). When the weight drops to substantially 90% of the full weight, the $C_i$'s are calculated and set. This 90% of full load point is determined by the fraction in the first term in the weight calculation equation.

While the above description describes various embodiments of the present invention, it will be clear that the present invention may be otherwise easily adapted to fit any configuration where field calibration of uncalibrated load cells is required.

Aspects of the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or an other computer readable storage medium, wherein, when the computer program code is loaded into and executed by a computer, the computer becomes an apparatus for practicing the invention.

Similarly, aspects of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A measuring and calibration method comprising the steps of:

installing at least two load sensing devices onto a load carrying device, said at least two load sensing devices each having an individual output signal;

connecting said individual output signal from each of said at least two load sensing devices to a computing device;

analyzing a first set of values and a second set of values of said individual output signals from each of said at least two load sensing devices; and calibrating said at least two load sensing devices responsive to said analysis of said output signals of said at least two load sensing devices;

estimating a weight of a substance in said load carrying device; and gradually removing said substance from said load carrying device while monitoring and determining relative rates in change of said individual output signals to calculate an associated relative scale factor for each individual load sensing device.

2. The measuring and calibration method of claim 1 wherein each of said at least two load sensing devices is a load cell transducer.

3. The measuring and calibration method of claim 1 wherein said individual output signals from said at least two load sensing devices is an electrical signal.

4. The measuring and calibration method of claim 3 wherein said electrical signal indicates changes in voltage.

5. The measuring and calibration method of claim 3 wherein said electrical signal indicates changes in current.

6. The measuring and calibration method of claim 1 further including the step of determining a minimum calibration value.

7. The measuring and calibration method of claim 6 wherein determining the minimum calibration value includes monitoring and recording said first set of values while said load carrying device is loaded at a low, known weight of a substance.

8. The measuring and calibration method of claim 7 wherein said minimum calibration value is determined by summing said first set of values.

9. The measuring and calibration method of claim 1 wherein the step of analyzing said first set of values includes determining an offset value for each of said at least two load sensing devices.

10. The measuring and calibration method of claim 1 wherein the step of analyzing said first set of values from said at least two load sensing devices includes determining a scale factor for each of said load sensing devices.

11. The measuring and calibration method of claim 10 wherein said scale factor is a term expressed in units per pound of load.

12. The measuring and calibration method of claim 1 further including the step of determining a maximum calibration value.

13. The measuring and calibration method of claim 12 wherein the step of determining the maximum calibration value includes the step of substantially filling said load carrying device with a volume of a substance having a known weight.

14. The measuring and calibration method of claim 13 further including the step of recording said second set of values.

15. The measuring and calibration method of claim 14 further including the step of summing said second set of values to determine said maximum calibration value.

16. The measuring and calibration method of claim 1 wherein the step of estimating the weight of said substance includes recording a third value of the output signal from each individual load sensing device and dividing each of said third values by said associated scale factor each load sensing device to estimate a substance weight at said individual load sensing device.

17. The measuring and calibration method of claim 16 wherein the step of estimating the weight of the substance includes summing together all of the load sensing device estimated weights.

18. The measuring and calibration method of claim 1 wherein the step of calculating said associated scale factor for each of said at least one load sensing device includes using the following equation:

$$C_i = \frac{\left[\sum_{i=1}^{n}(N100_i - N90_i)\right]}{(N100_i - N90_i) \times n}$$

where:

$C_i$=the scale factor for load cell "i";

$N100_i$=the reading from the ith load cell at substantially full load;

$N90_i$=the reading from the ith load cell at substantially 90% of full load; and n=the number of load cells.

19. The measuring and calibration device of claim 17 wherein the step of estimating said weight of said substance within said load carrying device includes using the following equation:

$$W = \frac{\sum_{i=1}^{n} \delta N_i \cdot C_i}{\sum_{i=1}^{n} (N_{MaxCal\_i} - N_{MinCal\_i}) \cdot C_i} \cdot (W_{MaxCal} - W_{NimCal}) + W_{MinCal}$$

where:

$\delta N_i = N_i - N_{MinCal\_i}$;

$N_{MinCal\_i}$=the reading from the ith load cell at the Minimum Calibration;

$N_{MaxCal\_i}$=the reading from the ith load cell at the Maximum Calibration;

$C_i$=the scale factor for the ith load cell, as calculated above;

$W_{MaxCal}$=the weight entered by the user at full load during Maximum Calibration; and $W_{MinCal}$=the weight entered by the user at no load during Minimum Calibration.

20. A method for weight calibration and measurement comprising the steps of:

installing at least two load sensing devices onto a load carrying device, said at least two load sensing devices each having an output signal;

connecting said output signals from each of said at least two load sensing devices to a computing device;

analyzing a first set of output signal values and a second set of output signal values;

calibrating said at least two load sensing devices responsive to said analysis of said output sets of signals by solving the equation $$C_i = \frac{\left[\sum_{i=1}^{n}(N100_i - N90_i)\right]}{(N100_i - N90_i) \times n}$$

where:

$C_i$=the scale factor for load cell "i";

$N100_i$=the reading from the ith load cell at substantially full load;

$N90_i$=the reading from the ith load cell at substantially 90% of full load; and n=the number of load cells;

to calculate a scale factor for each of said at least two load sensing devices by solving the following equation $$W = \frac{\sum_{i=1}^{n} \delta N_i \cdot C_i}{\sum_{i=1}^{n} (N_{MaxCal\_i} - N_{MinCal\_i}) \cdot C_i} \cdot (W_{MaxCal} - W_{NimCal}) + W_{MinCal}$$

where:

$\delta N_i = N_i - N_{MinCal\_i}$;

$N_{MinCal\_i}$=the reading from the ith load cell at the Minimum Calibration;

$N_{MaxCal\_i}$=the reading from the ith load cell at the Maximum Calibration;

$C_i$=the scale factor for the ith load cell, as calculated above;

$W_{MaxCal}$=the weight entered by the user at full load during Maximum Calibration; and $W_{MinCal}$=the weight entered by the user at no load during Minimum Calibration;

to calculate a weight of said substance within the load carrying device.

21. An apparatus for measurement and calibration comprising:

a load carrying device;

at least two load sensing indicators used with the load carrying device, said at least two load sensing indicators each configured to provide an output signal; and a computing device, said computing device being configured to (a) analyze said output signals to calculate a weight of a substance in said load carrying devices;

(b) to calculate a scale factor for each of said at least two load indicators; and (c) to calculate said scale factor for each of said at least two load indicators by identifying relative rates of change of said output signals during a removal of said substance from said load carrying device.

22. A measuring and calibration method comprising the steps of:

installing at least two load sensing devices onto a load carrying device, said at least two load sensing devices each having an individual output signal;

establishing an initial calibration for each of said at least two load sensing devices;

altering a load in said load carrying device while monitoring said individual output signals to determine relative rates in change of said individual output signals;

calculating an associated relative scale factor for each individual load sensing device based on said determined relative rates of change; and utilizing each of said associated relative scale factors to establish a final calibration for each of said at least two load sensing devices.

\* \* \* \* \*